(12) United States Patent
Lee (10) Patent No.: US 10,343,232 B2
(45) Date of Patent: Jul. 9, 2019

(54) RESISTANCE WELDING DEVICE AND METHOD FOR WELDING VEHICLE PART USING THE SAME

(71) Applicant: HYUNDAI MOTOR COMPANY, Seoul (KR)

(72) Inventor: Hyun Woo Lee, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 887 days.

(21) Appl. No.: 14/810,152

(22) Filed: Jul. 27, 2015

(65) Prior Publication Data

US 2016/0158872 A1 Jun. 9, 2016

(30) Foreign Application Priority Data

Dec. 5, 2014 (KR) .......................... 10-2014-0174069

(51) Int. Cl.
| *B23K 11/11* | (2006.01) |
| *B23K 11/31* | (2006.01) |
| *B23K 101/00* | (2006.01) |

(52) U.S. Cl.
CPC ............. *B23K 11/11* (2013.01); *B23K 11/314* (2013.01); *B23K 11/315* (2013.01); *B23K 2101/006* (2018.08); *Y10S 901/42* (2013.01)

(58) Field of Classification Search
CPC .............................. Y10S 901/42; B23K 11/11
USPC ................................................ 219/86.9, 116
See application file for complete search history.

(56) References Cited

U.S. PATENT DOCUMENTS

| 2,045,523 | A | * | 6/1936 | Fassler | B23K 11/31 |
| | | | | | 219/86.9 |
| 3,089,020 | A | * | 5/1963 | Hurlebaus | B23K 11/163 |
| | | | | | 219/86.9 |
| 4,117,296 | A | * | 9/1978 | Becker | B23K 11/163 |
| | | | | | 219/91.21 |
| 8,334,474 | B1 | * | 12/2012 | Oatridge | B23K 11/315 |
| | | | | | 219/86.9 |
| 2008/0006677 | A1 | | 1/2008 | Kumagai et al. | |
| 2012/0241416 | A1 | * | 9/2012 | Sakamoto | B23K 11/115 |
| | | | | | 219/91.2 |
| 2014/0352999 | A1 | * | 12/2014 | Song | C23C 14/165 |
| | | | | | 174/68.2 |

(Continued)

FOREIGN PATENT DOCUMENTS

| EP | 1872893 A1 | 1/2008 |
| JP | 4-270076 A | 9/1992 |

(Continued)

OTHER PUBLICATIONS

Notification of First Office Action dated Sep. 29, 2018 issued in Chinese Patent Application No. 20151049806081 (with English translation).

*Primary Examiner* — Geoffrey S Evans
(74) *Attorney, Agent, or Firm* — Morgan Lewis & Bockius LLP (57) ABSTRACT

A welding device of a robot arm includes a welding machine having a first pressing member which includes a cylindrical first pressing part and a second pressing member which includes a second pressing part inserted into a hollow of the first pressing part. A transformer supplies a positive (+) current to the first pressing member and a negative (−) current to the second pressing member. The first and second pressing parts have the same co-axis.

7 Claims, 7 Drawing Sheets

(56) References Cited

U.S. PATENT DOCUMENTS

2015/0183049 A1* 7/2015 Lee .................. B23K 11/115
219/86.33

FOREIGN PATENT DOCUMENTS

| | | |
|---|---|---|
| JP | 11-764 A | 1/1999 |
| JP | 2002-239748 A | 8/2002 |
| JP | 2003-117660 A | 4/2003 |
| JP | 2007-14968 A | 1/2007 |
| JP | 2011-31269 A | 2/2011 |
| JP | 2011-255396 A | 12/2011 |
| KR | 10-2007-0005894 A | 1/2007 |
| KR | 10-2012-0076045 A | 7/2012 |

* cited by examiner

RESISTANCE WELDING DEVICE AND METHOD FOR WELDING VEHICLE PART USING THE SAME

CROSS-REFERENCE TO RELATED APPLICATION

This application is based on and claims the benefit of priority to Korean Patent Application No. 10-2014-0174069, filed on Dec. 5, 2014 in the Korean Intellectual Property Office, the disclosure of which is incorporated herein in its entirety by reference.

TECHNICAL FIELD

The present disclosure relates to a welding device and a method for welding a vehicle part using the same, and more particularly, to a welding device and a welding method for a vehicle part capable of forming positive (+) and negative (−) electrodes on the same co-axis to increase efficiency and safety of welding.

BACKGROUND

A general manufacturing process of an automobile includes welding various structural parts such as a vehicle body panel molded by a press to complete an integrated vehicle body. Surfaces of each part are painted and unpainted for the completed vehicle body. A powertrain, suspension system, steering system, braking system, etc., are assembled, and then a door, a trunk lead, and a hood are assembled.

In the process of assembling the vehicle body, spot welding which is resistance welding is mainly applied to bond vehicle body parts, such as a roof, a pillar, a side panel, and a vehicle door flange. The spot welding melts contact portions by heat generated at the contact portions due to electric resistance and bonds the contact portions by applying a pressure thereto.

SUMMARY

The present disclosure has been made to solve the above-mentioned problems occurring in the prior art while advantages achieved by the prior art are maintained intact.

A spot welding device according to the related art does not have an external ground and therefore supplies a current through a vehicle body entirely, such that it may not obtain uniform welding quality due to an unstable path through which a current flows.

An aspect of the present disclosure provides a welding device and a method for welding a vehicle part using the same capable of coaxially implementing and conducting positive (+) and negative (−) electrodes to increase efficiency and safety of welding.

According to an exemplary embodiment of the present inventive concept, a welding device of a robot arm includes a welding machine having a first pressing member which includes a cylindrical first pressing part and a second pressing member which includes a second pressing part inserted into a hollow of the first pressing part. A transformer is configured to supply a positive (+) current to the first pressing member and a negative (−) current to the second pressing member.

The first pressing part and the second pressing part may have the same co-axis.

The second pressing part may have an elastic member at an outer periphery thereof between the first pressing member and the second pressing member.

The first pressing member may have an insulating plate attached thereon between an upper surface of the first pressing member and the elastic member for insulation.

The second pressing member may be a pressing cylinder which draws out or draws in the second pressing part when supplying power.

The second pressing part may have a tip disposed inside the first pressing part and penetrating through the first pressing part while the second pressing part is drawn out.

The welding machine may include a mounting member mounted on the robot arm.

The transformer may include a transformer member fixed to the mounting member and generating a positive (+) current and a negative (−) current. A positive (+) bus bar supplies the positive (+) current of the transformer member to the first pressing part of the first pressing member. A negative (−) bus bar supplies the negative (−) current of the transformer member to the second pressing part of the second pressing member.

The first pressing part may have an insulating film in the hollow thereof.

According to another exemplary embodiment of the present inventive concept, a method for welding a vehicle part to a vehicle body using a welding device includes supplying power to a transformer. A positive (+) current is supplied to a first pressing member through a positive (+) bus bar, and a negative (−) current is supplied to a second pressing member through a negative (−) bus bar.

The welding device may supply the positive (+) current while a first pressing part of the first pressing member presses the vehicle part having a protrusion and then supply the negative (−) current while a second pressing part of the second pressing member presses the protrusion by penetrating through the first pressing part.

The first pressing part may press the protrusion with a pressing force of 50 to 100 kgf.

The protrusion may have a size larger than a diameter of the first pressing part of the first pressing member.

The protrusion may have a height range from 0.8 mm to 1.5 mm and a width thereof may be 5 mm.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present inventive concept will be described in detail with reference to the accompanying drawings so that they can be easily practiced by those skilled in the art to which the present disclosure pertains. However, the present disclosure may be modified in various different ways and is not limited to the embodiments provided in the present description. In the accompanying drawings, portions unrelated to the description will be omitted in order to obviously describe the present disclosure, and similar reference numerals will be used to describe similar portions throughout the present specification.

A welding device according to an exemplary embodiment of the present inventive concept has first and second pressing members which are applied with a positive (+) current and a negative (−) current and are formed on the same co-axis to remove uncertainty of a path through which a current flows, thereby obtaining reliability and uniform quality of welding.

Hereinafter, the welding device according to exemplary embodiments of the present inventive concept will be described in detail with reference to the accompanying drawings.

Welding Device According to the Present Disclosure

Figure 1:
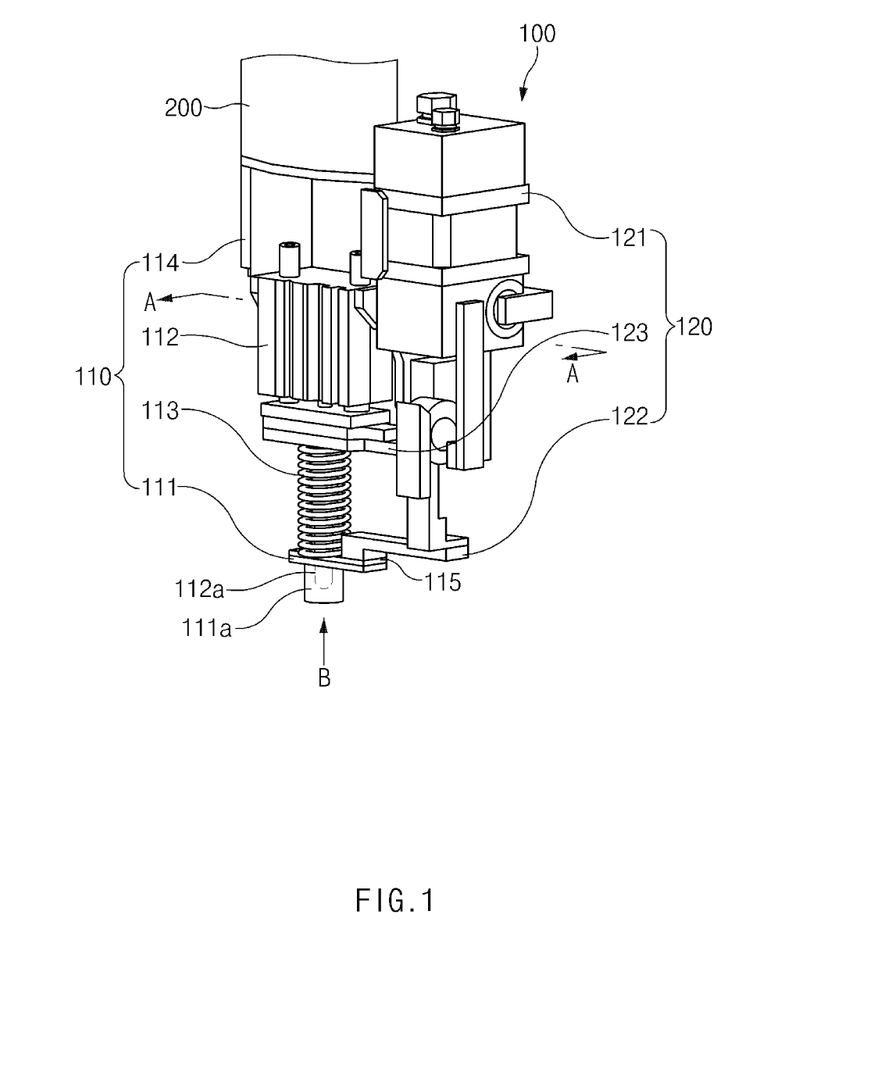
FIG. 1 is a perspective view illustrating a welding device according to an exemplary embodiment of the present inventive concept.

As illustrated in FIG. 1, a welding device 100 according to an exemplary embodiment of the present inventive concept is equipped in a robot arm 200 and includes a welding machine 110 in which two pressing members applied with a positive (+) current and a negative (−) current are formed on the same co-axis. A transformer 120 supplies a positive (+) current and a negative (−) current to the welding machine 110.

The welding machine 110 according to the exemplary embodiment of the present inventive concept includes a first pressing member 111 having a cylindrical first pressing part 111a and a second pressing member 112 having a second pressing part 112a which is inserted into a hollow of the first pressing part 111a.

Referring to FIG. 1, the welding machine 110 has a second pressing part 112a disposed inside an upper portion of the first pressing part 111a. A second pressing part 112a is inserted into a hollow of the first pressing part 111a of the first pressing member 111, such that the first pressing part 111a and the second pressing part 112a have the same co-axis.

Since the first pressing part 111a and the second pressing part 112a have the same co-axis, a positive (+) current and a negative (−) current flow are close to each other to prevent uncertainty of a current flow, thereby obtaining a uniform quality of welding.

The first pressing member 111 is vertically movably fixed to the transformer 120 which is coupled with a mounting member 114, and an elastic member 113 is provided at the second pressing part 112a between the first pressing member 111 and the second pressing member 112.

That is, the elastic member 113 uses a coil spring which encloses the second pressing part 112a, and the elastic member 113 is attached at a tip of the second pressing part 112a while elastically supporting the first pressing member 111. The elastic member 113 supports the first pressing member 111 so as not to excessively press a vehicle part (not illustrated) using the first pressing part 111a.

The second pressing member 112 may be a pressing cylinder which draws out or draws in the second pressing part 112a. That is, the second pressing member 112 penetrates through the hollow of the first pressing part 111a as the second pressing part 112 moves outside while supplying power, and returns to the hollow of the first pressing part 111a while the second pressing part 112a moves back in again while preventing the power. Accordingly, the welding device 100 according to an exemplary embodiment of the present inventive concept achieves stable and smooth operation.

The tip of the second pressing part 112a is positioned inside the first pressing part 111a normally. The tip of the second pressing part 112a and a tip of the first pressing part 111a have different heights, thus preventing the welding operation from being performed while the second pressing part 112a and the first pressing part 111a simultaneously adheres to a vehicle part (not illustrated) when the welding operation is prepared. The welding operation is performed as the second pressing part 112a and the first pressing part 111a simultaneously adhere to the vehicle part while the second pressing part 112a is drawn out from the first pressing part 111a by the second pressing member 112 when the welding preparation is completed. Accordingly, welding defect and an accident occurrence can be prevented.

The welding machine 110 includes the mounting member 114 which is connected to the robot arm 200. The mounting member 114 is coupled with an upper surface of the second pressing member 112 and coupled with the robot arm 200 by a bolt. That is, the welding machine 110 and the robot arm 200 may be firmly fixed by the mounting member 114.

Referring to FIG. 1, the mounting member 114 is vertically movably coupled with a transformer member 121 of the transformer 120. Thus, the welding machine 110 and the transformer 120 are coupled with each other, and the first pressing member 111 is elastically supported while being pressed by the elastic member 113.

Figure 2:
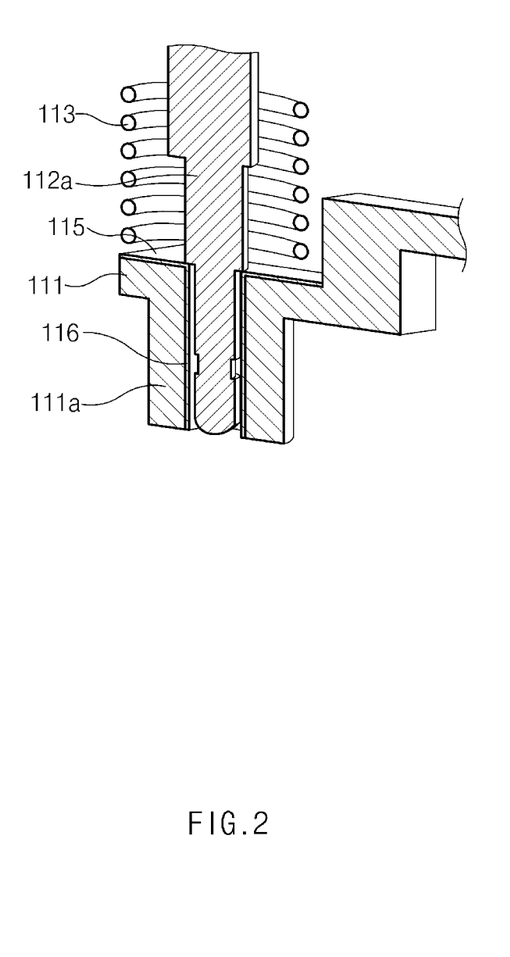
FIG. 2 is a cross-sectional view of a lower portion of a welding machine according to an exemplary embodiment of the present inventive concept.

Referring to FIG. 2, an adhering surface of the first pressing member 111 and the elastic member 113 have an insulating plate 115 insulating the second pressing member 112 and the elastic member 113 to prevent a current from being transferred to the first pressing member 111 through the second pressing member 112 and the elastic member 113, thereby increasing safety.

Figure 3:
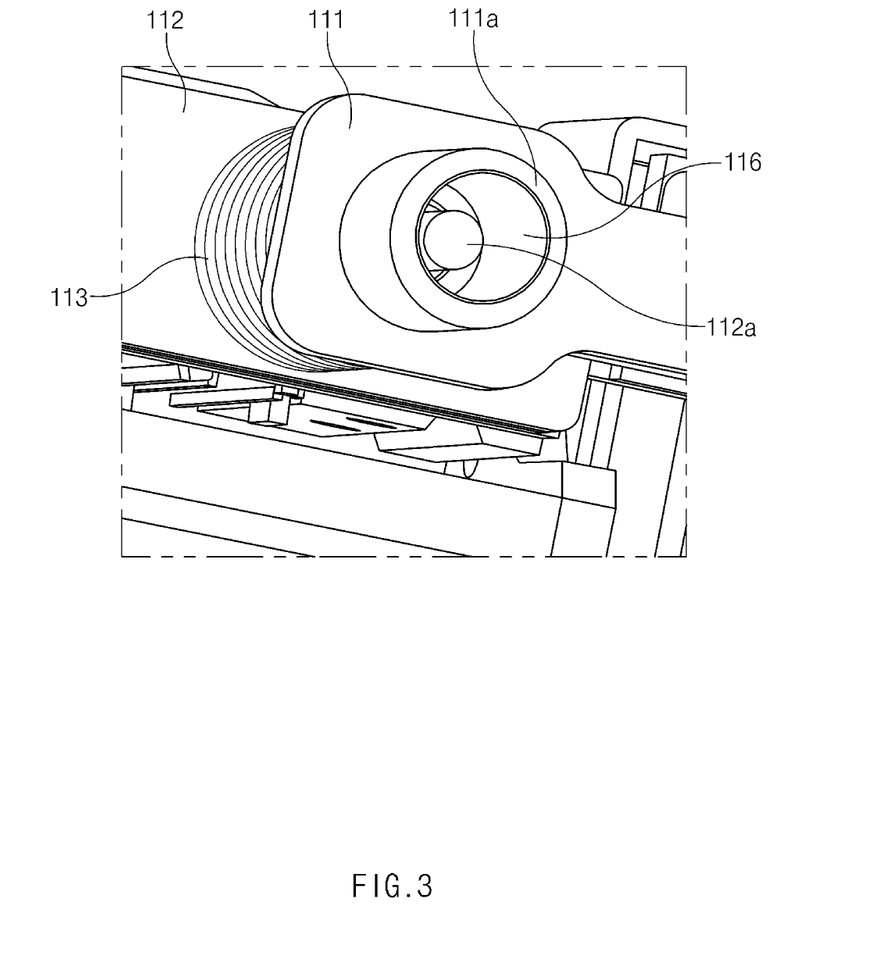
FIG. 3 is a bottom perspective view of the portion B illustrated in FIG. 1.

Referring to FIGS. 2 and 3, an inner circumferential surface of the hollow formed in the first pressing part 111a has an insulating film 116. The insulating film 116 insulates the first pressing part 111a and the second pressing part 112a to prevent them from being grounded, thereby increasing safety.

The transformer 120 according to the present disclosure generates the positive (+) current and the negative (−) current and includes the transformer member 121 which is fixed to the mounting member 114 and which generates the positive (+) current and the negative (−) current. A positive (+) bus bar 122 supplies the positive (+) current of the transformer member 121 to the first pressing part 111a of the first pressing member 111. A negative (−) bus bar 123 supplies the negative (−) current of the transformer member 121 to the second pressing part 112a of the second pressing member 112.

That is, the transformer 120 stably supplies the positive (+) current and the negative (−) current to the first pressing part 111a of the first pressing member 111 and the second pressing part 112a of the second pressing member 112, respectively, thereby stably performing the welding operation.

Method for Welding According to the Present Disclosure

Hereinafter, in describing another exemplary embodiment of the present inventive concept, the same components and function as those of the foregoing exemplary embodiments are denoted by the same reference numerals and the repeated description will be omitted.

Figure 4A:
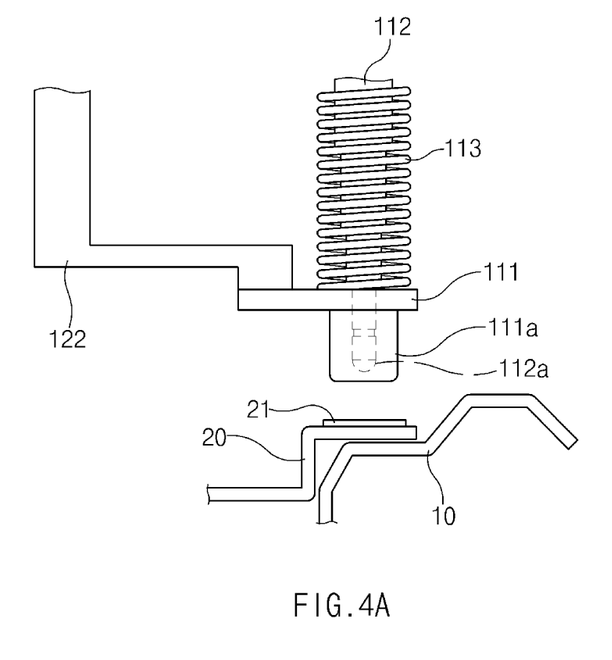
FIGS. 4A to 4C are diagrams illustrating a method for welding a vehicle part using the welding device according to an exemplary embodiment of the present inventive concept.

First, as illustrated in FIG. 4A, power is supplied to the transformer member 121 of the transformer 120. Then, the transformer member 121 supplies a positive (+) current to the first pressing part 111a of the first pressing member 111 through the positive (+) bus bar 122 and supplies a negative (−) current to the second pressing part 112a of the second pressing member 112 through the negative (−) bus bar 123.

Figure 4B:
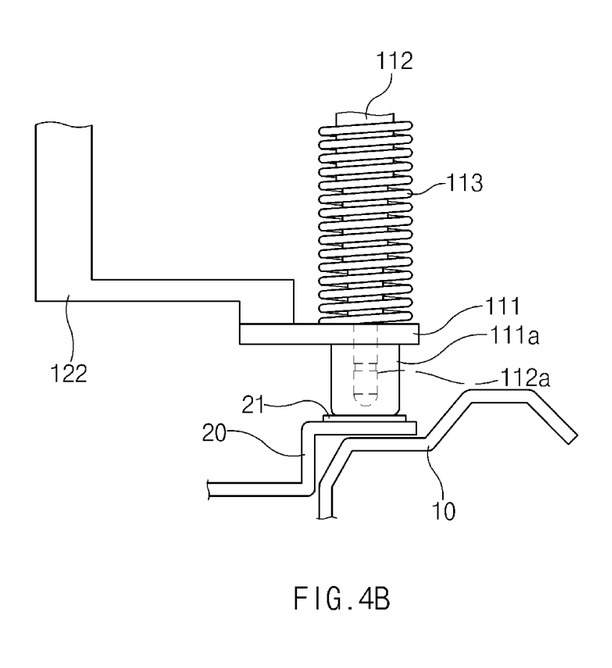

In this state, referring to FIGS. 1 and 4B, the robot arm 200 allows the first pressing part 111a to adhere to a protrusion 21 of a vehicle part 20 which is to be welded, such that the positive (+) current flows in the protrusion 21 of the vehicle part 20 by the first pressing part 111a. In this case, the first pressing member 111 presses the vehicle part 20 at a predetermined pressure while being elastically supported by the elastic member 113, thereby preventing the vehicle part 20 from being deformed. Negative (−) current supply of the second pressing member 112 to the first pressing member 111 through the elastic member 113 is prevented while the insulating plate 115 is disposed at an adhering surface between the elastic member 113 and the first pressing member 111.

Figure 4C:
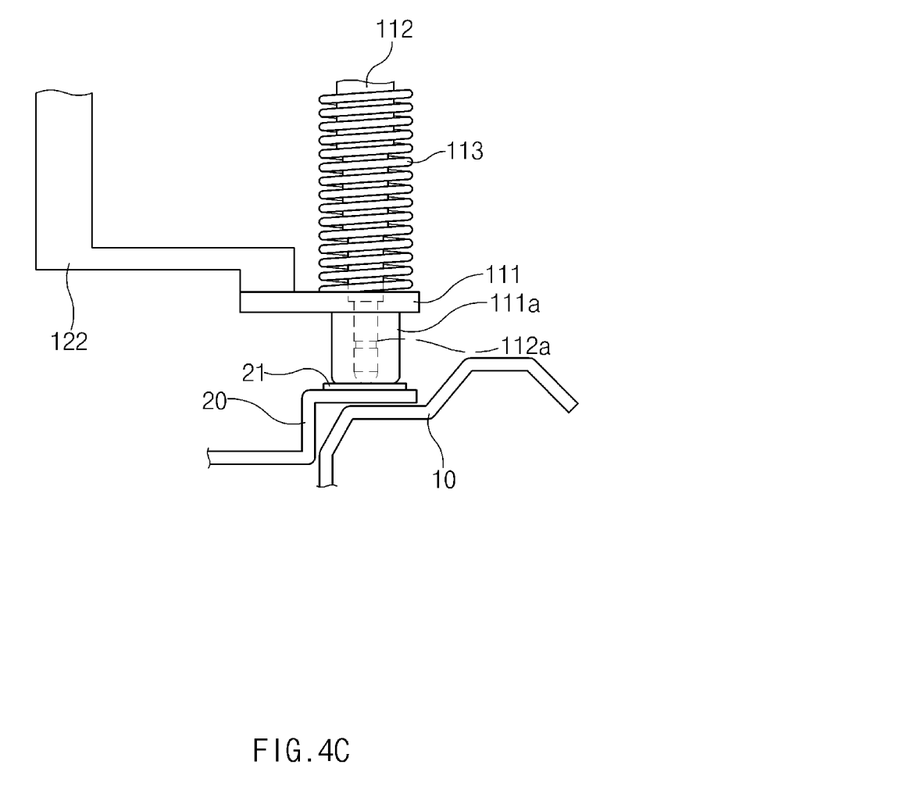

Referring to FIG. 4C, when the power is supplied to the second pressing member 112, the second pressing member 112 draws out the second pressing part 112a, the second pressing part 112a adheres to the protrusion 21 of the vehicle part 20 while penetrating through the first pressing part 111a. The negative (−) current flows into the vehicle part 20 by the second pressing part 112a to simultaneously flow the positive (+) current and the negative (−) current into the vehicle part 20 to generate high heat, such that the vehicle part 20 is melted by the high heat and welded to a vehicle body 10. In this case, the second pressing part 112a and the first pressing part 111a are prevented from being grounded while the insulating film 116 is provided between the second pressing part 112a and the first pressing part 111a.

That is, the welding device according to the present disclosure generates the positive (+) current and the negative (−) current flow to be close to a vehicle part, thereby obtaining uniform welding.

Figure 5:
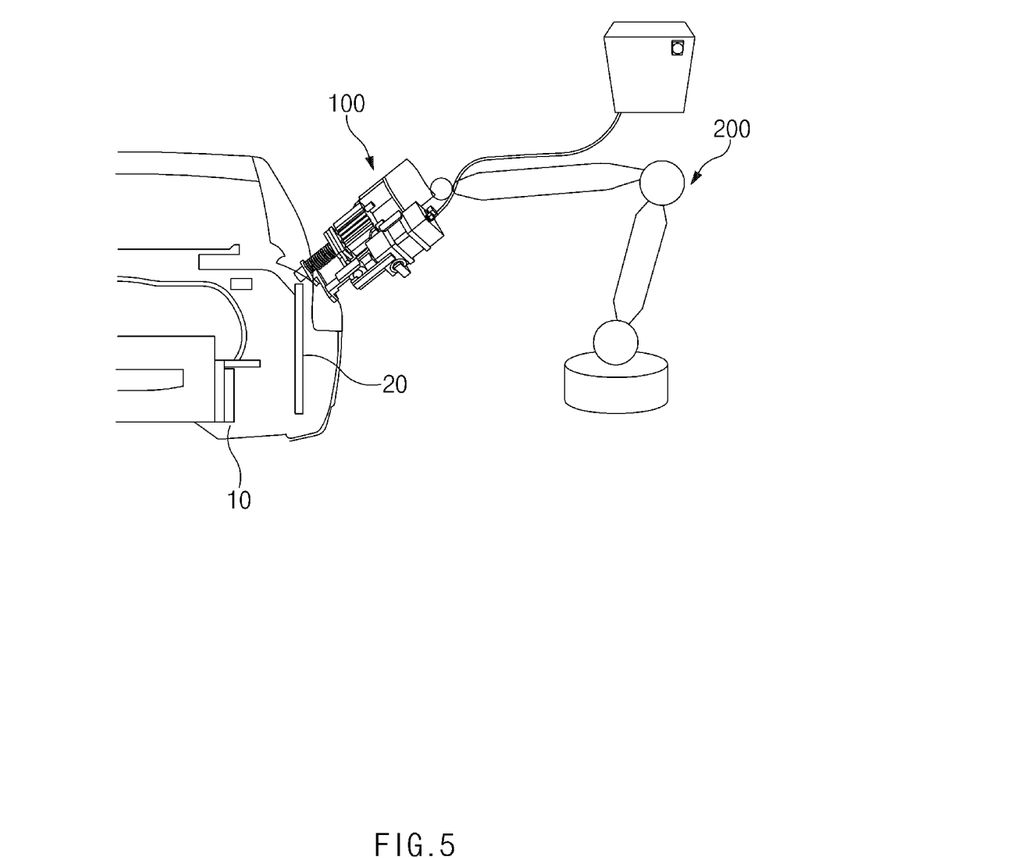
FIG. 5 is a diagram illustrating the welding device equipped in a robot arm for welding a vehicle part according to an exemplary embodiment of the present inventive concept.
Figure 6:
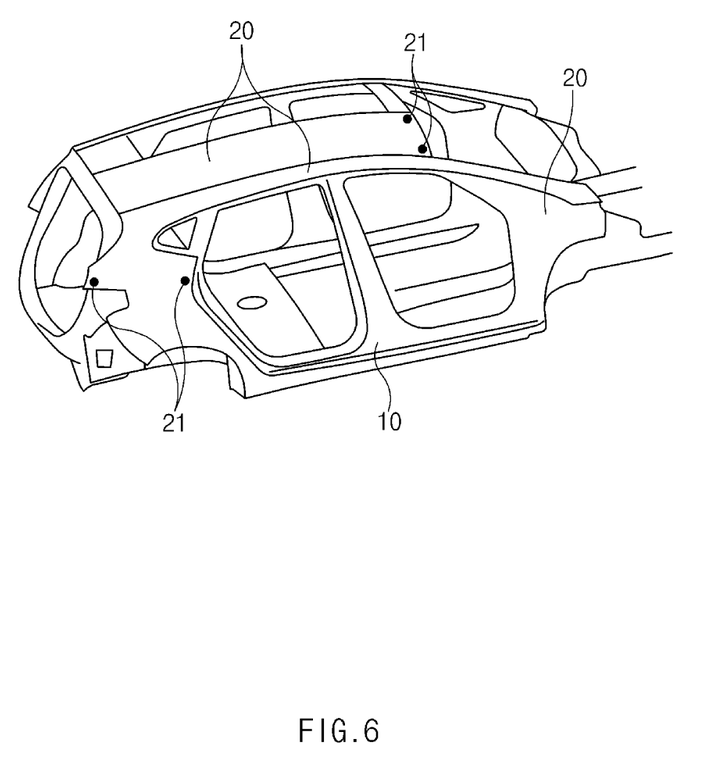
FIG. 6 is a diagram illustrating protrusions of parts welded to a vehicle body.

Referring to FIGS. 5 and 6, the welding device for welding a vehicle part according the present disclosure welds and fixes the vehicle part 20 attached to the vehicle body 10. The vehicle part 20 includes at least one protrusion 21 adhering to the vehicle body 10 and the welding device 100 welding the protrusion 21 to the vehicle body 10 by high heat generated by supplying the positive (+) current and the negative (−) current to the protrusion 21, in which the welding device 100 moves by the robot arm 200.

Here, the welding device 100 and the robot arm 200 have the same configuration and function as described in the foregoing exemplary embodiments, and therefore, the same reference numerals are used and the detained description thereof will be omitted.

The vehicle part 20 has the at least one protrusion 21 provided at a portion to be adhered to the vehicle body 10. The at least one protrusion 21 protrudes toward the vehicle body 10, such that the at least one protrusion 21 stably adheres to the vehicle body and the positive (+) current and the negative (−) current are concentrated on the protrusion 21, thereby increasing weldability.

Here, in the welding device 100, the protrusion 21 has the same or larger size than an outer diameter of the first pressing part 111a of the first pressing member 110, such that the first pressing part 111a may stably adhere to the protrusion 21.

In this case, a pressing force of the first pressing part 111a may be 50 to 100 kgf. That is, the first pressing part 111a presses the protrusion 21 at 50 to 100 kgf to stably adhere the protrusion 21 to the vehicle body 10, in particular, to prevent the protrusion 21 from be deformed, thereby increasing marketability.

A height of the protrusion 21 ranges from 0.8 mm to 1.5 mm, and a width thereof is 5 mm. When the height is too high (higher than 1.5 mm), a gap between the vehicle body 10 and the vehicle part 20 is large, thus deteriorating assembling performance. When the width is equal to or less than 3 mm, the welded portion is small, and thus, the vehicle body 10 is easily separated from the part 20. When the width is equal to or more than 6 mm, the welded portion is bigger than the adhering portion, thus deteriorating aesthetic quality and marketability.

Therefore, according to the present disclosure, the protrusion 21 is formed on the vehicle part 20 which adheres to the vehicle body 10, and the welding machine 110 of the welding device 100 adheres to the protrusion 21 and supplies a current through the transformer 120 to weld the vehicle part 20 to the vehicle body 10. That is, the welding device 100 melts the protrusion 21 by generating high heat when the positive (+) current is supplied while the first pressing part 11a of the first pressing member 111 presses the protrusion 21. Then the negative (−) current is supplied while the second pressing part 112a presses the protrusion 21 using the second pressing member 112 to weld the protrusion 21 to the vehicle body 10.

The welding device and method for the vehicle part according to the present disclosure may increase efficiency of welding by the first and second pressing members formed on the same co-axis, in particular, removing the uncertainty of current flow, thereby obtaining the reliability and the uniform quality of welding.

The present disclosure obtains the following effects.

First, the welding device includes first and second pressing members, to which the positive (+) current and the negative (−) current are supplied, on the same co-axis to increase efficiency and safety of welding.

Second, an elastic member may be provided between the first and second pressing members to maintain an interval between the first and second pressing members, thus increasing continuity of operations.

Third, a tip of the first pressing member and a tip of the second pressing member may have different heights to prevent unintended welding.

Fourth, a vehicle part may have a protrusion such that the first and second pressing member may be simultaneously pressed and welded to each other to obtain uniform quality of welding.

It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. A resistance welding device for a robot arm, the welding device comprising:
   a welding machine attached to the robot arm, wherein the welding machine includes:
      a first pressing member which includes a cylindrical first pressing part; and
      a second pressing member which includes a second pressing part inserted into a hollow of the first pressing part; and
   a transformer configured to supply a positive (+) current to the first pressing member and a negative (−) current to the second pressing member,
   wherein the second pressing part has an elastic member at an outer periphery thereof between the first pressing member and the second pressing member, and
   wherein the first pressing member has an insulating plate attached thereon between an upper surface of the first pressing member and the elastic member for insulation.

2. The resistance welding device according to claim 1, wherein the first pressing part and the second pressing part have the same co-axis.

3. The resistance welding device according to claim 1, wherein the welding machine includes a mounting member mounted on the robot arm.

4. The resistance welding device according to claim 3, wherein the transformer includes:
   a transformer member fixed to the mounting member and generating the positive (+) current and the negative (−) current;
   a positive (+) bus bar supplying the positive (+) current of the transformer member to the first pressing part of the first pressing member; and
   a negative (−) bus bar supplying the negative (−) current of the transformer member to the second pressing part of the second pressing member.

5. The resistance welding device according to claim 1, wherein the second pressing member is a pressing cylinder which draws out or draws in the second pressing part when supplying power.

6. The resistance welding device according to claim 1, wherein the second pressing part has a tip disposed inside the first pressing part and penetrating through the first pressing part while the second pressing part is drawn out.

7. The resistance welding device according to claim 1, wherein the first pressing part has an insulating film in the hollow thereof.

* * * * *